US011157795B2

(12) United States Patent
Amir et al.

(10) Patent No.: US 11,157,795 B2
(45) Date of Patent: Oct. 26, 2021

(54) GRAPH PARTITIONING AND PLACEMENT FOR MULTI-CHIP NEUROSYNAPTIC NETWORKS

(71) Applicant: INTERNATIONAL BUSINESS MACHINES CORPORATION, Armonk, NY (US)

(72) Inventors: Arnon Amir, San Jose, CA (US); Pallab Datta, San Jose, CA (US); Myron D. Flickner, San Jose, CA (US); Dharmendra S. Modha, San Jose, CA (US); Tapan K. Nayak, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 846 days.

(21) Appl. No.: 15/457,658

(22) Filed: Mar. 13, 2017

(65) Prior Publication Data

US 2018/0260682 A1    Sep. 13, 2018

(51) Int. Cl.
*G06N 3/04* (2006.01)
*G06N 3/063* (2006.01)
*G06N 20/00* (2019.01)

(52) U.S. Cl.
CPC ........... *G06N 3/0454* (2013.01); *G06N 3/049* (2013.01); *G06N 3/063* (2013.01); *G06N 20/00* (2019.01)

(58) Field of Classification Search
CPC ....... G06N 3/0454; G06N 3/049; G06N 3/063
See application file for complete search history.

(56) References Cited

U.S. PATENT DOCUMENTS

| 2011/0119057 A1* | 5/2011 | Moore ................... G10L 17/18 704/232 |
| 2012/0109866 A1* | 5/2012 | Modha .................. G06N 3/088 706/28 |
| 2015/0269478 A1* | 9/2015 | Datta ..................... G11C 11/18 706/33 |
| 2016/0132767 A1 | 5/2016 | Alpert et al. |
| 2017/0076179 A1* | 3/2017 | Martineau ............ G06N 3/0454 |
| 2017/0252924 A1* | 9/2017 | Vijayanarasimhan ...................... B25J 9/1612 |

OTHER PUBLICATIONS

Popovych, Oleksandr V., Markos N. Xenakis, and Peter A. Tass. "The spacing principle for unlearning abnormal neuronal synchrony." PLoS One 10.2 (2015): e0117205. (Year: 2015).*

(Continued)

*Primary Examiner* — Luis A Sitiriche
*Assistant Examiner* — Sehwan Kim
(74) *Attorney, Agent, or Firm* — Erik Huestis; Stephen Kenny; Foley Hoag LLP

(57) ABSTRACT

Graph partitioning and placement for multi-chip neurosynaptic networks. According to various embodiments, a neural network description is read. The neural network description describes a plurality of neurons. The plurality of neurons has a mapping from an input domain of the neural network. The plurality of neurons is labeled based on the mapping from the input domain. The plurality of neurons is grouped into a plurality of groups according to the labeling. Each of the plurality of groups is continuous within the input domain. Each of the plurality of groups is assigned to at least one neurosynaptic core.

18 Claims, 17 Drawing Sheets

(56) References Cited

OTHER PUBLICATIONS

Chen, Denis Guangyin, et al. "Pulse-modulation imaging—Review and performance analysis." IEEE transactions on biomedical circuits and systems 5.1 (2011): 64-82. (Year: 2011).*
Heathcote, Jonathan. Building and operating large-scale SpiNNaker machines. Diss. The University of Manchester (United Kingdom), 2016. (Year: 2016).*
Popovych, Oleksandr V., Markos N. Xenakis, and Peter A. Tass. "The spacing principle for unlearning abnormal neuronal synchrony." PLoS One 10.2 (2015): e0117205. (Year: 2015).*
Chen, Denis Guangyin, et al. "Pulse-modulation imaging—Review and performance analysis." IEEE transactions on biomedical circuits and systems 5.1 (2011): 64-82. (Year: 2011).*
Heathcote, Jonathan. Building and operating large-scale SpiNNaker machines. Diss. The University of Manchester (United Kingdom), 2016. (Year: 2016).*
Hugo Angel, "A Scale-up Synaptic Supercomputer (NS16e): Four Perspectives," Apr. 8, 2016, DA6NCI.com.
Wei Wen, et al., "A New Learning Method for Inference Accuracy, Core Occupation, and Performance Co-optimization on TrueNorth Chip," Cornell University Library, arXiv.org.

* cited by examiner

FIG. 7

GRAPH PARTITIONING AND PLACEMENT FOR MULTI-CHIP NEUROSYNAPTIC NETWORKS

BACKGROUND

Embodiments of the present invention relate to assigning neurons to cores in a neurosynaptic system, and more specifically, to graph partitioning and placement for multi-chip neurosynaptic networks.

BRIEF SUMMARY

According to various embodiments of the present disclosure methods and computer program products for assigning neurons to cores in a neurosynaptic system are provided. A neural network description is read. The neural network description describes a plurality of neurons. The plurality of neurons has a mapping from an input domain of the neural network. The plurality of neurons is labeled based on the mapping from the input domain. The plurality of neurons is grouped into a plurality of groups according to the labeling. Each of the plurality of groups is continuous within the input domain. Each of the plurality of groups is assigned to at least one neurosynaptic core.

BRIEF DESCRIPTION OF THE SEVERAL VIEWS OF THE DRAWINGS

FIG. 7 illustrates an exemplary SFC based placement according to embodiments of the present disclosure.

DETAILED DESCRIPTION

Figure 1:
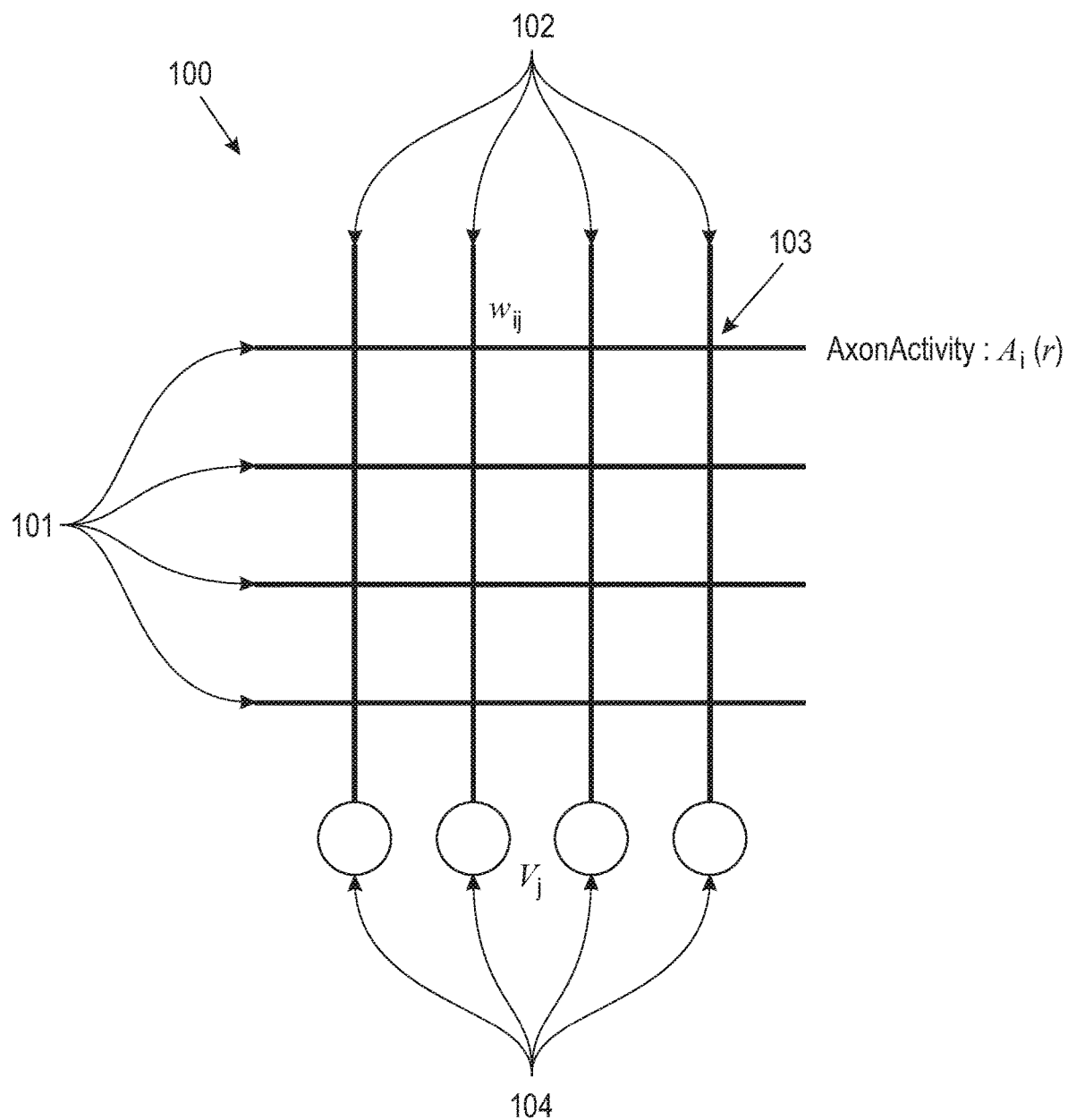
FIG. 1 depicts a neurosynaptic core according to embodiments of the present disclosure.

Deep neural network are able to achieve human-level performance on a broad spectrum of recognition tasks. Machine learning has demonstrated a wide range of applications in, e.g., image recognition, audio classification, associative memory tasks, and pattern recognition. It is becoming widely applicable in different industrial domains across a broad spectrum of products and technical fields. One of the most appealing attributes of these neural networks is their portability to low-power neuromorphic hardware which can be deployed in mobile devices and native sensors that can operate at extremely low power requirements in real-time. Neuromorphic computing demonstrates an unprecedented low-power computation substrate that can be used in many applications.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

In summary, a neurosynaptic network may be composed via the Corelet Programming Language. Many of these networks are multi-chip networks. In general, communication bandwidth within cores residing on the same chip is much higher and more power efficient than between cores residing on two or more chips. Accordingly, designing efficient corelets and networks is key for achieving real-time run-time performance. In particular, it is advantageous to minimize the total number of cores used to implement a given computation. However, such minimization may lead to network constructs that inhibit efficient placement, because their connectivity pattern is such that any placement to chips would result in a large number of edges connecting across chips. Accordingly, in a multi-chip neurosynaptic system, there is a tradeoff between minimization of the number of cores and placement with run-time performance.

These neural networks may be trained off-line using various machine learning algorithms. This allows the implementation of deep-learning using neuromorphic computing. After offline training, they may be deployed during run-time on physical hardware.

The process of mapping a neurosynaptic core onto a specific physical location in a chip or a multichip system is known as placement. The objective of placement is to cluster cores that have high communication amongst them and minimize inter-chip communication. This is extremely critical for minimizing the overall active power required to route spikes between neurosynaptic cores across chip boundaries and hence the overall power of the system. Placement is also important in order to minimize the number of spikes travelling off-chip, and thus meeting bandwidth constraints between each pair of chips and guaranteeing that the computation can be performed in real-time or faster than real-time.

Placement in the context of designing multi-chip neurosynaptic networks is analogous to the wirelength minimization problem in VLSI system design. Placement is generally an NP-Hard problem. It can be solved using different min-cut algorithms such as those applied in VLSI CAD design tools. Alternatively, it can be solved by designing heuristic algorithms that make use of the structure of the graph of neurosynaptic cores that is implementing an algorithm.

According to various embodiments of the present disclosure, methods and systems for designing corelets are provided that help ensure that the resulting neurosynaptic network is amenable for placement irrespective of the placement algorithm being used.

A multi-chip neurosynaptic system may comprise a $K \times K \times M$ configuration of neurosynaptic chips, where M corresponds to the number of $K \times K$ boards. The bandwidth between these chips is generally limited, according to the characteristics of the chips. To maximize the hardware throughput while minimizing the power consumption, a physical synthesis software is used to generate efficient core placement that minimizes the communication between cores across chips and maximizes communication between cores within each chip. In various neurosynaptic network design work-flows, the networks trained using, e.g., Caffe or MatConvNet, are converted into corelets after training and the corelets are then converted into model files that can be than loaded onto the specific neurosynaptic substrate at hand. The model file stores the neuron configurations, crossbar states and neuron-axon connections for all the cores. Various exemplary embodiments are described in terms of TrueNorth, but it will be appreciated that the present disclosure is applicable to a range of neurosynaptic substrates.

A deep convolution network of neurosynaptic cores can comprise of multiple layers of cores. It may be a feed-forward network comprising various type of layers such as convolution layers, splitter layers, or averaging (pooling) layers. Convolution layers perform three-dimensional convolution for a given patch size, stride, and group. In some embodiments, different TrueNorth cores are used for different topographic locations and groups. Such a construct provides natural sparsity in the network with convolution cores. Averaging layers may perform pooling on each feature map for a given patch size and stride. In some embodiments, a single TrueNorth core can pack large number of features from the same feature map, resulting in a densely-connected network. Similarly, in splitter layers, random choice of inputs for splitter cores may generate complex connections in the network.

For corelet composition, minimizing only the total number of cores at each layer of the convolution network may result in maximum packing cores. However, although this approach may provide a good solution for single-chip network, it may be unsuitable for a multi-chip network as it may lead to excessive cross-chip spikes traffic, thereby increasing power consumption and potentially hitting the spike bandwidth bound.

Corelets, when decomposed into network models, can be viewed as a network graph comprising nodes (neurosynaptic cores) and edges (connectivity between neurons on a neurosynaptic core and axons on target cores). This network should be efficiently placed on the physical hardware during the placement process. When placed on multi-chip hardware, the network should be partitioned into several partitions, each placed on one chip. A densely connected network with high degree of fan-out will often lead to less optimized placement solutions, resulting in large number of inter-chip edges, or neurons communicating across chips. This may significantly impact the run-time performance and increase power consumption in multi-chip networks.

Certain layers, or parts, of a neurosynaptic network, may be designed using neurosynaptic cores in many different ways. One design procedure is to minimize the total number of cores used to implement the computation. However, such implementations can lead to inefficient routing constructs that are not suitable for placement when we do partitioning of the graph using some heuristics.

According to various embodiments of the present disclosure, multiple efficient constructions are provided that lead to better placement (in the consequent placement process). Techniques are provided for evaluating efficient network constructs using neuromorphic hardware so that the underlying network can be efficiently mapped on to a multi-chip hardware substrate. This may be performed as a pre-step before placement is done, or before the overall network size and the number of chips to deploy is determined.

According to various embodiments of the present disclosure, techniques of constructing efficient networks are provided for sparsely connected graph on core-based neuromorphic substrate. These methods aid in generating networks with lower inter-core fan-out degree and thus helps in yielding optimal placement solutions that reduce interchip communication bottlenecks, are useful for run-time performance of multi-chip networks, and result in better energy efficiency for the same logical network and data computation.

In various embodiments, different types of placement-aware corelet designs with neuron allocation constructs are provided that create corelets which are better for placement on multi-chip hardware. In some such embodiments, the input data domain is partitioned into a regular grid of small blocks of inputs, where each block is assigned to one core. In some such embodiments, the cells of the input data domain are enumerated using a space filling curve, and then assigned to cores by that order. In some such embodiments, a block-based routing scheme is provided for efficient construction that enables graph partitioning during placement for implementing a splitting and pooling construct using neuromorphic substrate.

In various embodiments, device maps are used that associate pins of input connectors with their cell locations in the input domain (e.g., "red value of RGB pixel <x,y> is associated with pin <i> of connector <j>"). This approach is demonstrated on several corelets, including splitters and average pooling layers. These corelets may provide central computational elements for implementing complex cognitive algorithms on neuromorphic hardware using different machine learning frameworks, such as deep convolutional networks, object recognition, object detection and tracking and more.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
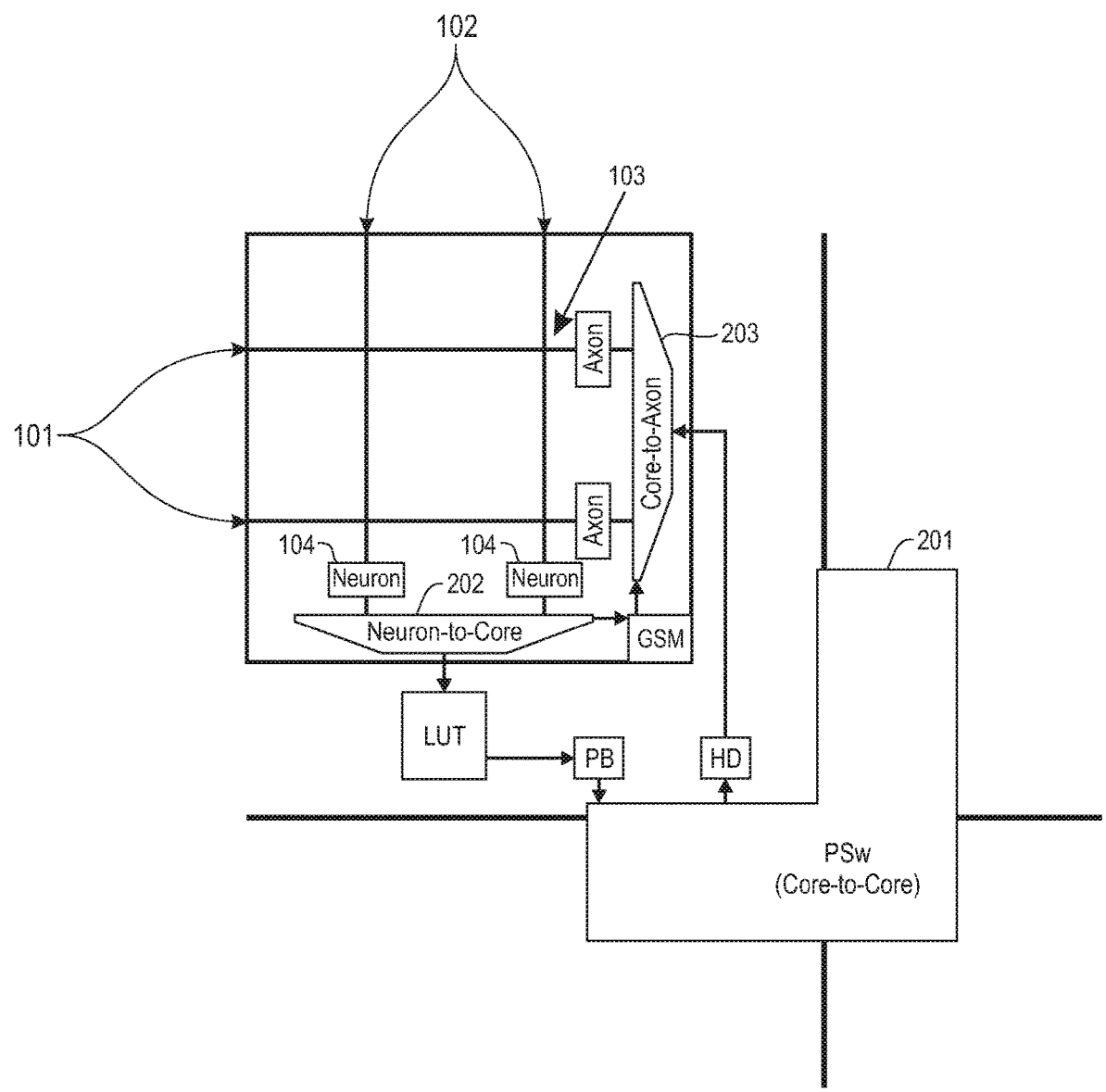
FIG. 2 depicts a neurosynaptic core and mesh router according to embodiments of the present disclosure.
Figure 3A:
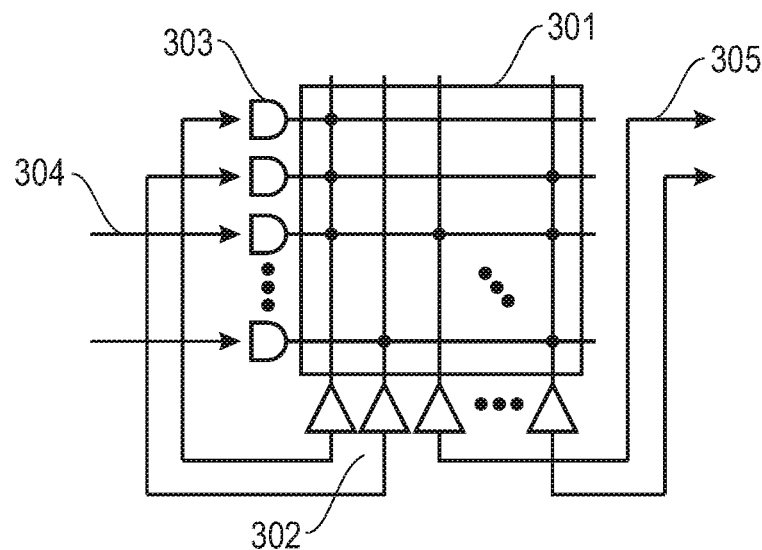
FIGS. 3A-F illustrate the composition of corelets in a neurosynaptic system according to embodiments of the present disclosure.
Figure 3B:
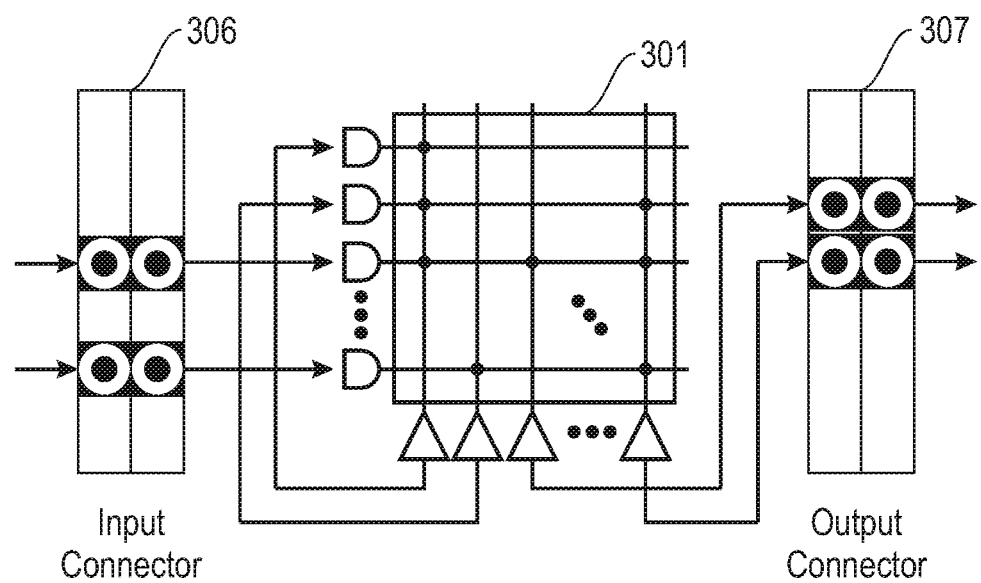
Figure 3C:
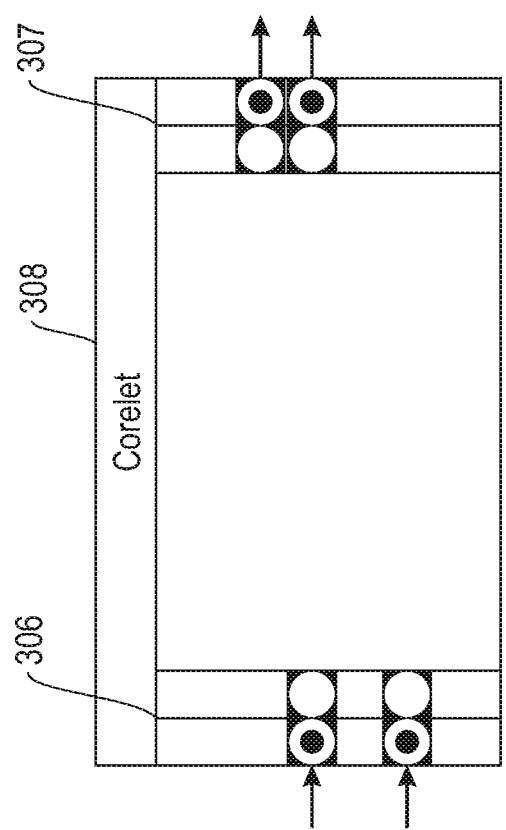
Figure 3D:
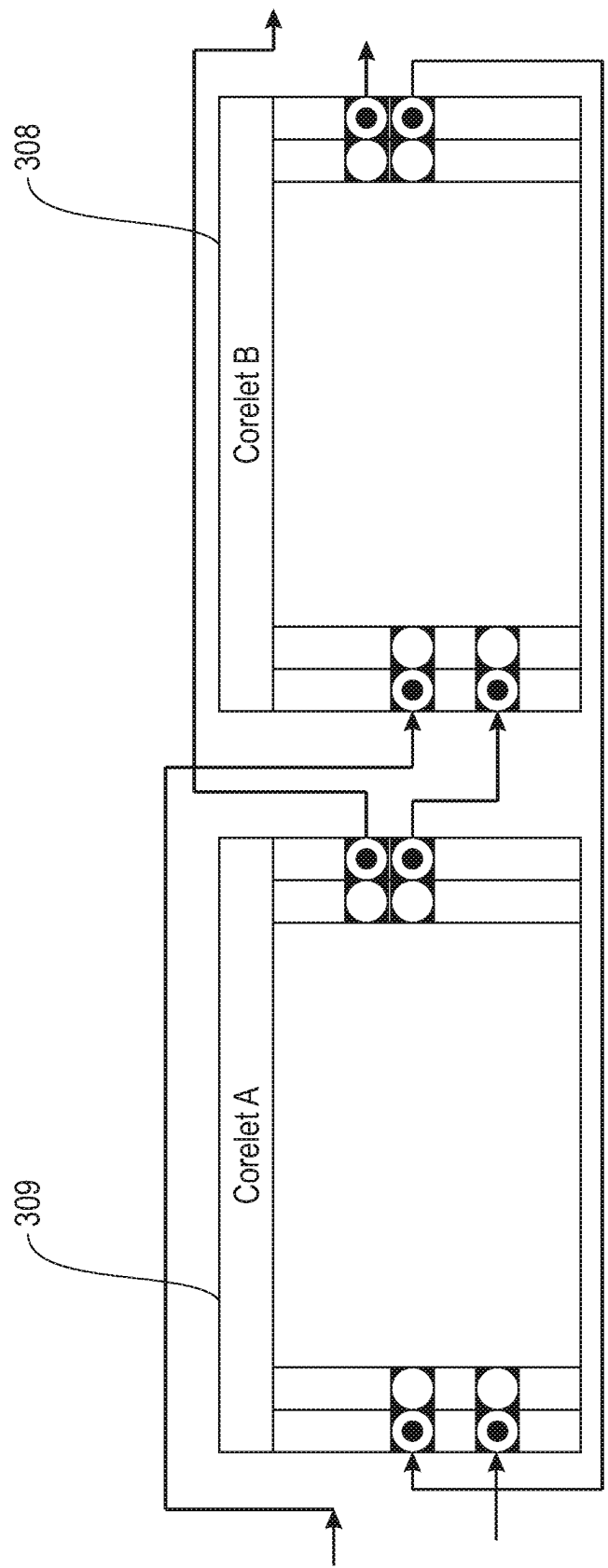
Figure 3E:
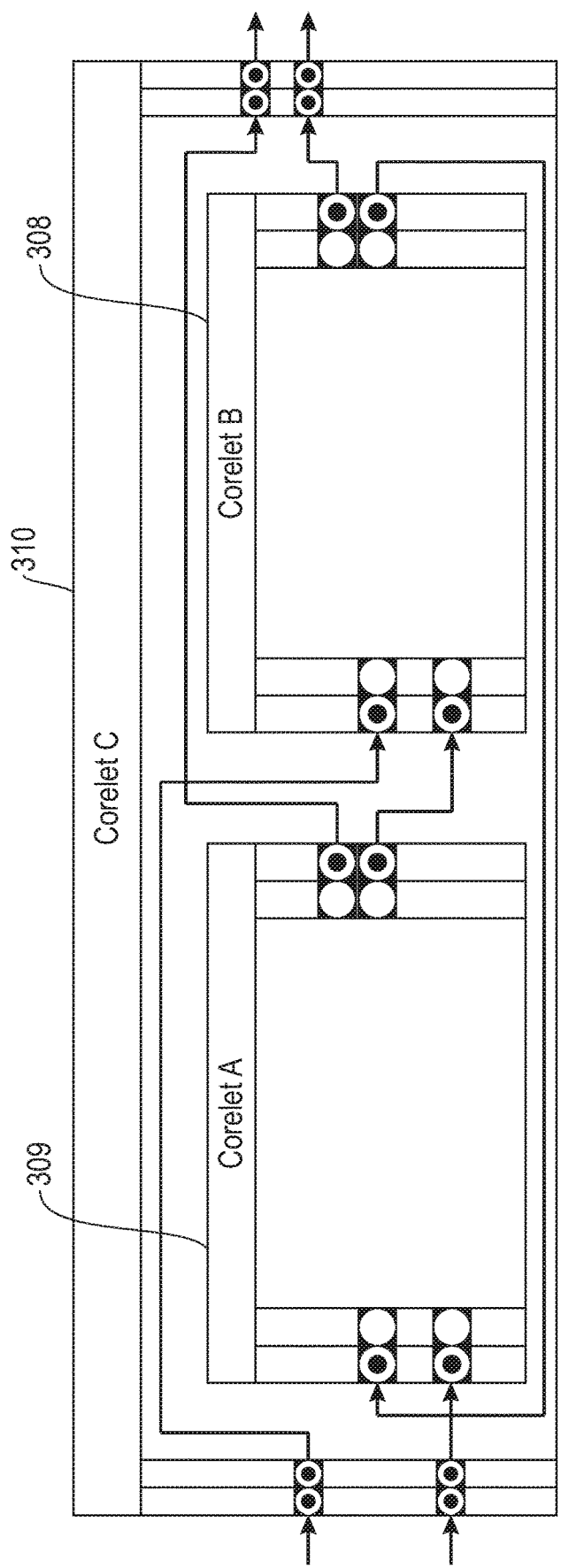
Figure 3F:
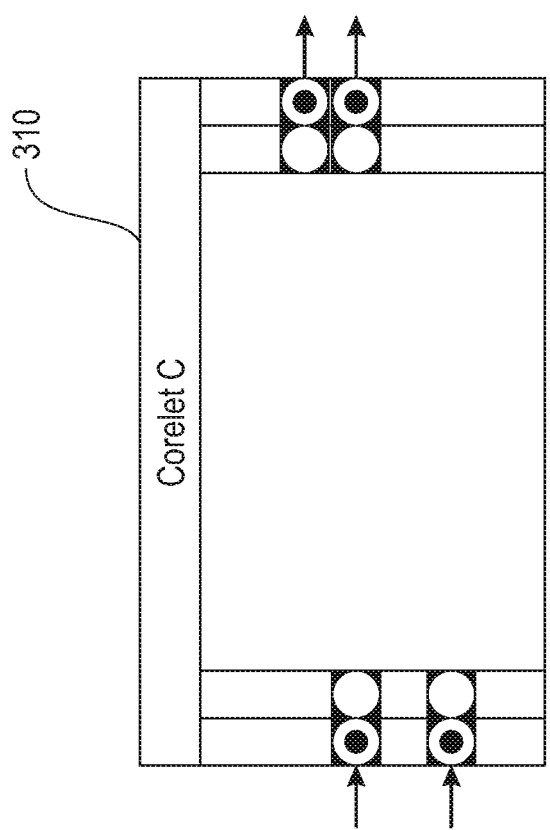

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided.

Referring to FIG. 3, a corelet is illustrated in the context of a neuromorphic core and a network of neuromorphic cores. In FIG. 3A, a neurosynaptic core 301 is depicted, comprising neurons 302 connected to axons 303, as well as external inputs 304 and external outputs 305. In FIG. 3B, an input connected 306 and an output connector 307 is depicted that binds the pins of the connector to each external input 304 and each external output 305. In FIG. 3C, the core 301 is encapsulated in a corelet 308 that hides the internal connectivity of the network of neurosynaptic cores and only externalizes the external connectivity 306, 307. In FIGS. 3D-F, corelet 308 is combined with corelet 309 to form corelet 310. In this way, composite corelets may be constructed using multiple neurosynaptic cores. Each of the external inputs to a given corelet may be spikes that are generated using an encoding scheme to convert an image/video/audio or any other signal.

In various embodiments, device maps are used to topographically route pixels/signals from the input space to the neurosynaptic cores on the chips. The input signal space can be considered to be a N dimensional structure. For images, this N dimensional structure may be a 3 dimensional signal with dimensions of image height, width, and channels/features. In the case of a multi-chip neurosynaptic network, these signals should be routed topographically to the input cores on each chip. Each pin in an input and output connector as described above does not capture which pixel/index it corresponds to in the input/output signal space. Accordingly, a device map is provided that builds an association of the pixel/signal index in a N dimensional grid to a unique pin on a connector. In the case of a multi-chip neuro-synaptic system with K chips, the image signal (H×W×C) would be cut into K disjoint partitions/clusters such that there is minimal number of edges across chip boundaries at the successive convolution layers. Each convolution layer with overlapping patches generates cross-chip edges at the topographic chip boundaries of feature maps. The device map maps cells of the input domain to each pin on input connectors. Each pixel or signal element from the signal space may be sent to multiple axons on the input layer of neurosynaptic cores. The task of splitting the signal to multiple axons is done via a splitter core. These cores may be placed independently and is not part of the splitter design process.

To summarize the above, the present disclosure provides device maps for input signal partition among multiple chips at the first layer. Multiple types of routing constructs are provided that are useful for efficient implementation of splitting constructs: splitters designed based on Space Filling Curves (SFC); and block based splitters. The tradeoffs between the approaches are described below in terms of the number of cores used to implement each construct. In addition, the tradeoffs in terms of ease of placement are also discussed. Efficient routing constructs are presented to implement a pooling or averaging layer functionality using neuromorphic cores. The impact of efficient routing constructs is demonstrated in terms of placement and also real-time performance while running networks on a multi-chip system.

Figure 4:
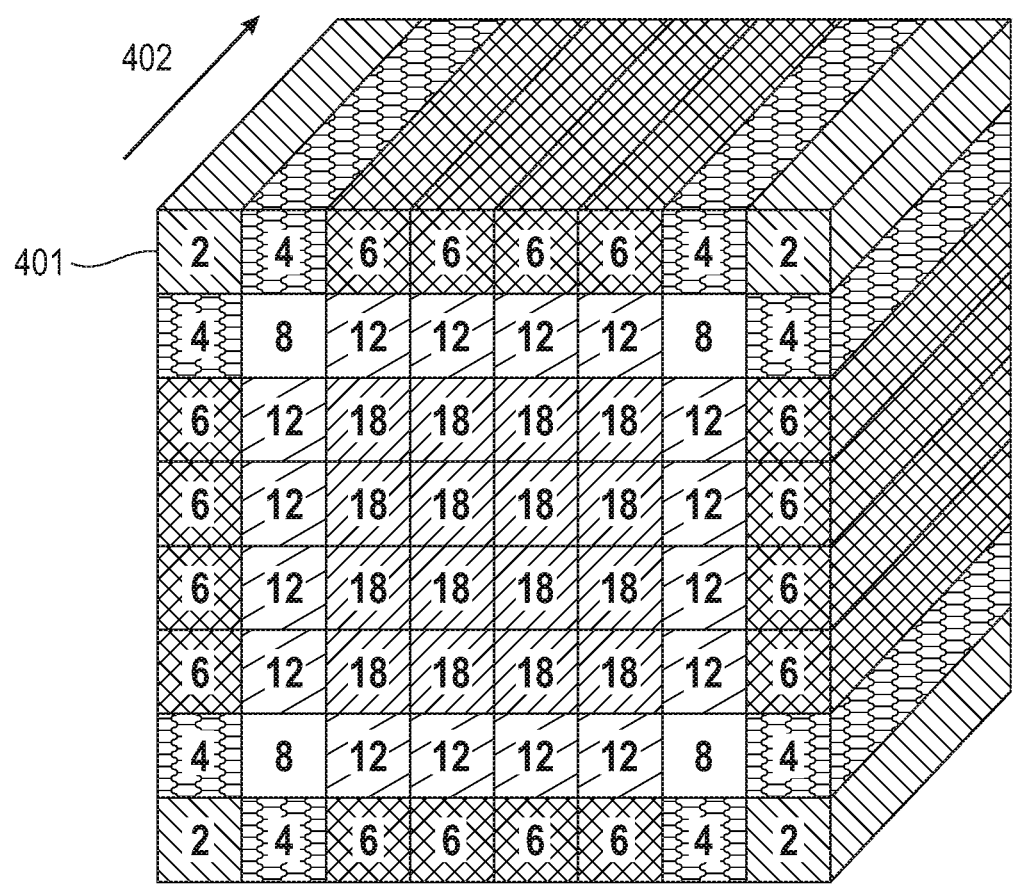
FIG. 4 illustrates an exemplary splitter layer for a 3D input signal according to embodiments of the present disclosure.

Referring to FIG. 4, an example of a splitter layer for a 3D input signal is illustrated. Each cell (e.g., 401) represents a pixel. The third dimension 402 corresponds to features for each pixel. In various embodiments, a variety of features may be present, such as RGB color values, CMYK color values, HST color values, edges, etc. The number in each cell represents the number of splitter outputs (copies) for that pixel/feature, and pixels/features with same number of copies are marked by same color to illustrate the resulted pattern. Such a splitter over n-dimensional input data may be provided as a corelet, and is useful, e.g., for splitting the input layer of a deep convolutional network such as EEDN. In some embodiments, splitters are assigned to cores during corelet construction.

In alternative approaches, input pixels are enumerated by rows (Raster Scan, or row-wise), or by columns (column-wise, e.g., in mathematical array notations). Such enumerations may be used for data delivery, for example, a sequence of pixels and their RGB values in a row-wise order. When working with a core-based neuromorphic architecture, these pixels are assigned to axons or neurons on neurosynaptic cores. The order in which they are assigned to cores impacts efficiency.

Row-wise or column-wise orders are easy to program (e.g., for corelet construction). They also lead to a small number of cores because all (or nearly all) of the axons or neurons on a core are being used until the core is full, and then a new core is allocated and the assignment continues on that core, until finishing assignment of all input pixels to axons. Thus, the total number of cores is minimized. However, these constructs may lead to networks containing large number of edges connecting between many cores, which are challenging (or impossible) to place on chips due to the high cross-connectivity between large number of cores. This is due to the underlying neural network connecting each of these pixels to a number of axons for computing functions over neighborhoods of pixels. In the example of FIG. 4, a pixel may participate in up to 18 such neighborhoods. Each of these neighborhoods may be computed on a different neurosynaptic core. Hence, the splitter of this pixel would need to connect to up to 18 different cores.

When many such splitters are put together on a single core, the total join number of destination cores they all connect to defines the core-to-core fan-out. When this number is high, it means that it is harder to find a partitioning of the cores into groups with low connectivity between them, to enable good placement. A row-wise or column-wise scan collect pixels along a line into one core. These pixels' neighborhoods have very little in common. It would be better to collect together splitters of pixels with as much shared, overlapping, neighborhoods as possible, so that most of their destination cores will coincide and the overall fan-out of this splitter core will be low.

Accordingly, the present disclosure provides several techniques to address the above-described issues with such linear approaches.

According to various embodiments, assignment is provided using space filling curves (SFC). A space filling curve is a type of mathematical fractal. In the continuous domain, SFC are fractal curves. Various SFCs are based on a simple pattern. After setting the initial pattern, each segment of that pattern is replaced with the entire pattern, scaled down to match that segment size. When this process is carried on, to smaller and smaller scales, it results in a curve that fills up the entire area (or n-dimensional space), and forms a two dimensional (or n-dimensional) object. In the discrete domain, such as the pixels of an image, the SFC traverses through all the pixels, thereby creating an enumeration of the pixels by the order it passes through them. Similarly, an SFC can fill an n-dimensional space. Not all fractal curves are space filling. A curve is space filling if its dimension is the same as the dimension of the space in which it is embedded and it passes through all the points in that domain. While various examples provided herein make use of a Hillbert SFC, it will be appreciated that the present disclosure is applicable using any other SFC, such as Moore Curves and Peano Curves.

Figure 5C:
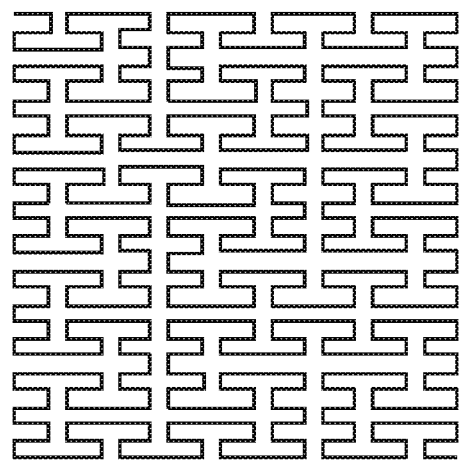
FIGS. 5A-C illustrate an exemplary space filling curve according to embodiments of the present disclosure.
Figure 5B:
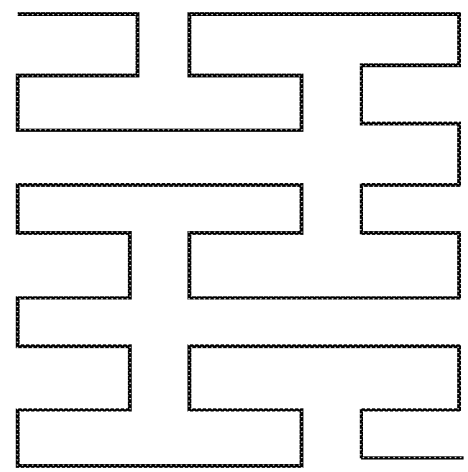
Figure 5A:
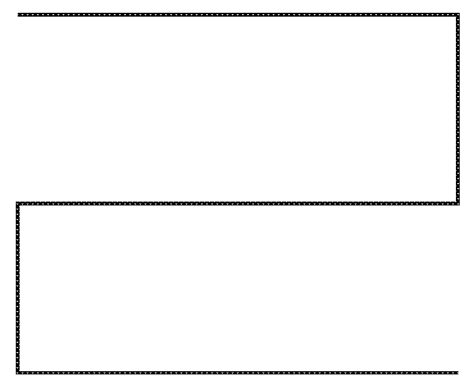

Referring to FIGS. 5A-5C, three iterations of the Peano curve are illustrated. The limit of the Peano curve is a space-filling curve.

Figure 6:
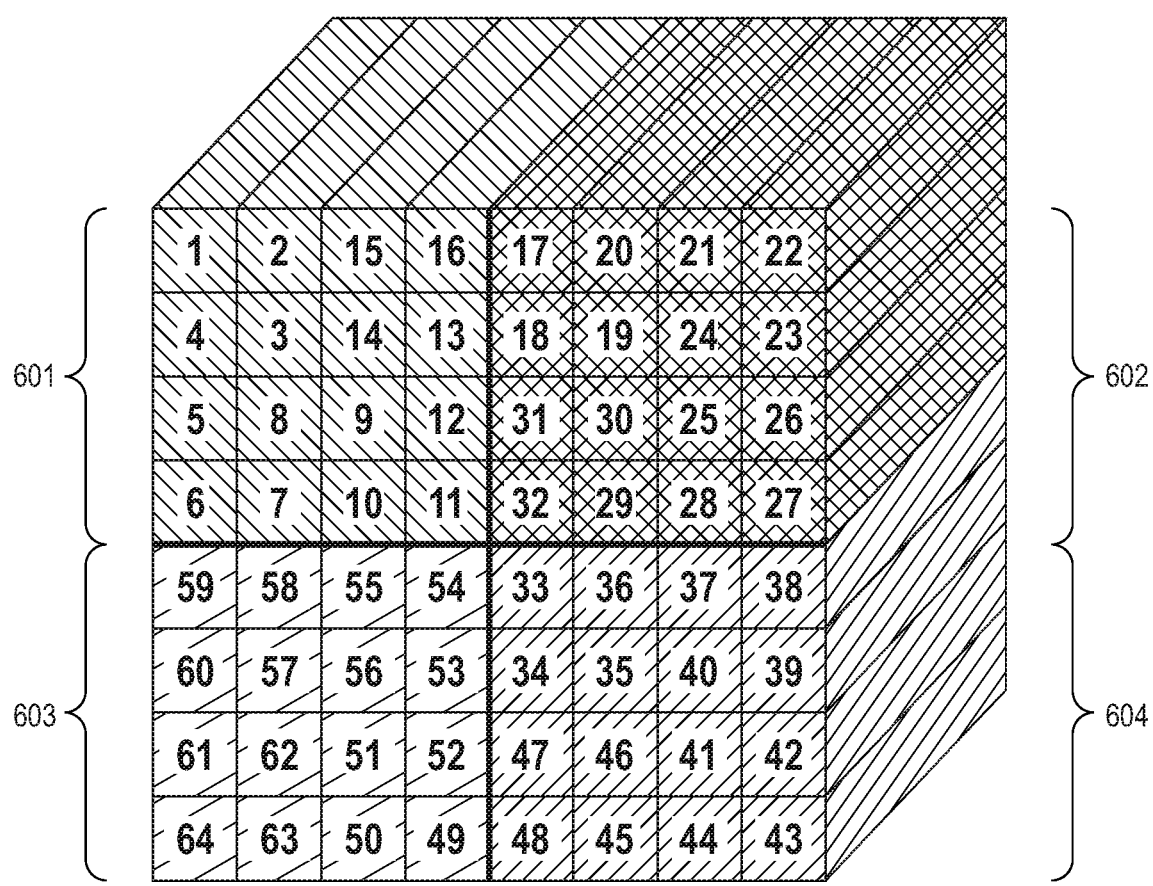
FIG. 6 illustrates routing using space filling curves at the splitter layer according to embodiments of the present disclosure.

Referring now to FIG. 6, routing using space filling curves at the splitter layer is illustrated. The numbers in each cell represent the sequence of input pixels/features into splitter cores. The cores may later be placed over 4 chips, corresponding to the four quadrants 601 . . . 604.

Using SFCs such as those shown in FIG. 5 enables a better routing construct where input pixels are chosen in a sequence to fill up a three-dimensional region with a continuous sequence of adjacent cells. First features in pixel location 1 are selected, and then pixel locations are iterated in the SFC order. The SFC collects neighboring pixels into the same core, thereby increasing the overlap between their neighborhoods and thus reducing the fan-out of those splitter cores. The splitter cores require minimal inter-chip connectivity, enabling a very efficient placement, shown in this example as a 4-chip network.

Moreover, the SFC arrangement consumes a minimum number of cores, similar to row-wise or column-wise methods. Thus, efficient solutions are provided for placement-aware core composition for specific feature map dimensions.

When using SFC, the input (image) need not necessarily be split into four square quadrants like in this simple illustration. The SFC provides an enumeration of the pixels which is more local than, a raster scan. Pixels which are close on the SFC are also close spatially (in the n-dimensional input space). Instead of dividing the input domain into K equal blocks, and assigning one per chip, the pixels can be enumerated from 1 to N using the SFC. The first N/K pixels may then be assigned to cores in the first chip, the next N/K pixels to cores in the second chip and so on, to K chips, by pixels' order in the SFC. By assigning consequent pixels to the same core, core-to-core fan-out is kept low. The resulting region boundaries might not show up as rectangular blocks in the input domain (each region is associated with one chip and is composed of all pixels assigned to cores in that chip). However, the partition's boundary is still expected to be small relative to the partition area (both measured in the number of pixels they occupy). SFCs can produce a small ratio between the number of pixels on the partition's boundary and the total number of pixels in the partition.

When working with a higher dimensional input domain, inputs may be referred to as cells rather than pixels. The same SFC properties apply. Using an SFC for partitioning allows any input domain, of any degree and dimension, to be partitioned into any number of K partitions using the same process.

In one embodiment, a weight may be associated with each input cell (such as the splitting degree of each input pixel in the splitter example). In such a case, the SFC may be split into K equal-weight segments. When the weight represents a required resource, such as the number of neurons required for a cell, the equal-weight partitioning creates partitions requiring similar amounts of resources, such as similar number of output neurons, and therefore a similar number of neurosynaptic cores.

Figure 7:
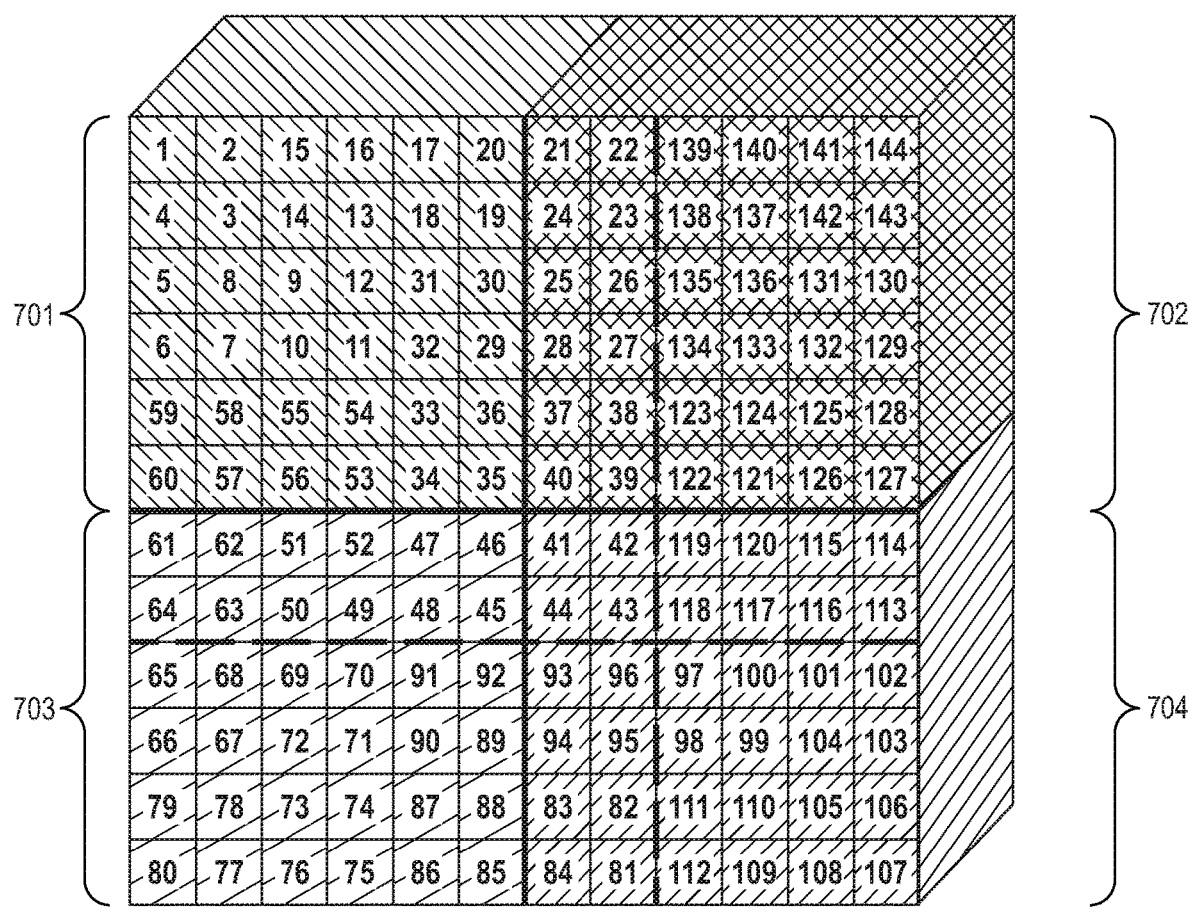

In the example given above, the SFC co-locates with the image quadrants, which is well-suited for a four-chip hardware placement. However, for a 3-chip or 5-chip placement, identical size blocks may not work as well. For example, while in FIG. 6, there are only three transitions across the quadrant boundary (16-17, 32-33, 48-49), in the layout shown in FIG. 7, there are 10 transitions (20-21, 28-29, 36-37, 40-41, 120-121, 44-45, 92-93, 84-85, 52-53, 60-61). However, the layout of FIG. 7 may be slightly modified to improve efficiency by adjusting the SFC cropping algorithm to center the SFC such that the block boundaries coincide with the SFC's natural partition boundaries. In the example of FIG. 7, moving the center of the SFC two rows down and two columns to the right would substantially reduce the number of quadrant transitions. Alternatively, the area may be first partitioned to blocks and then each area may be scanned by a SFC to determine the pixels-to-cores placement.

While SFC always allows equal or better placements than row-wise or column-wise assignments, there are scenarios, as illustrated in FIG. 7, showing a 12×12×C feature map, where pixels from two quadrants of the image would be placed on the same core, thereby leading to increased communication between chips and less efficient placement. In the above case, aligning the center of the SFC with the image center resolves the efficiency issue.

While various embodiments use Hilbert space filling curves, other types of space filling curve are suitable for use according to the present disclosure, including Moore curves and Peano curves. Similarly, while various examples provided herein are given in terms of two dimensions, many SFC's may be used to map n-dimensional domains to an ordered sequence.

The mapping can depend not only on the topography of the inputs to the layer but also on the topography of the outputs. For example, splitters have a single input and multiple outputs. Thus, in some embodiments, the placement partitions the outputs based on their target cores/chips, so that a splitter core is co-located on the same chip with its target cores. In some embodiments, both inputs and outputs are taken into account.

Figure 8:
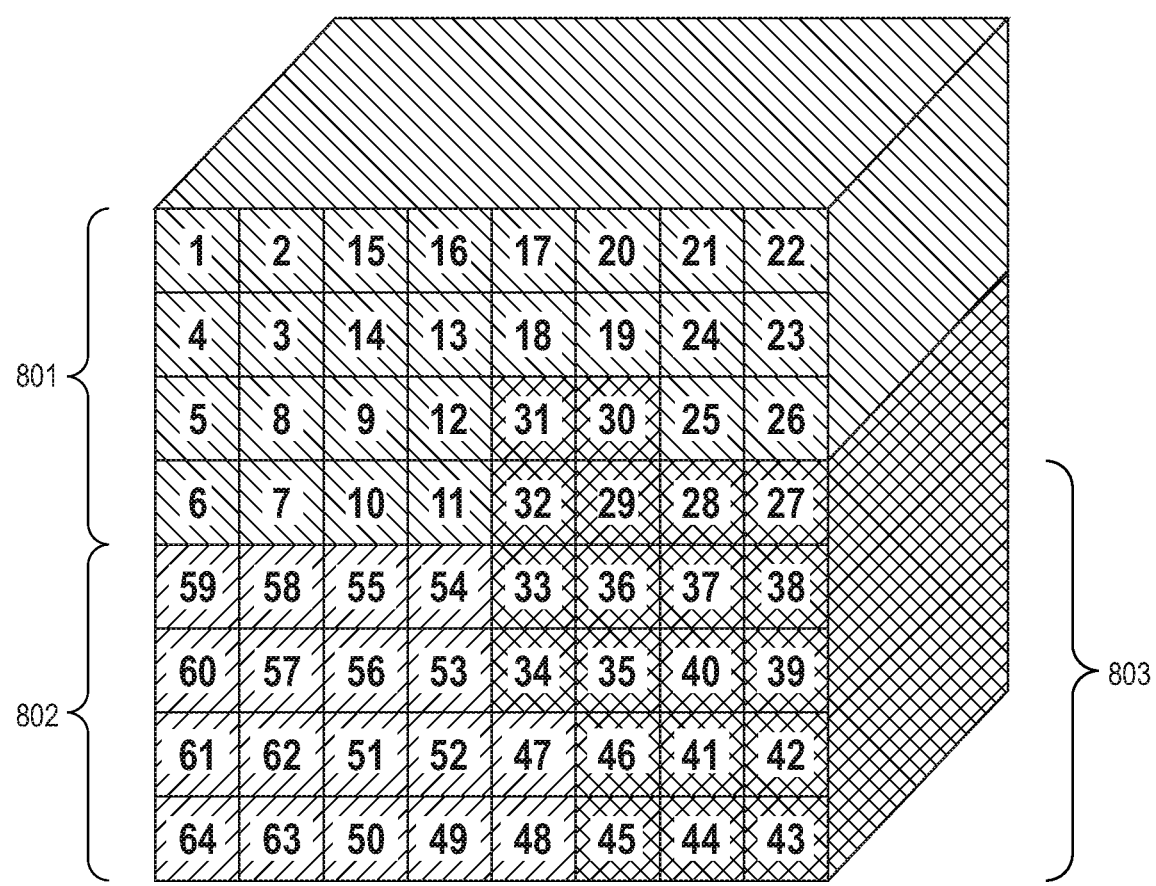
FIG. 8 illustrates another exemplary SFC based placement according to embodiments of the present disclosure.

Referring to FIG. 8, an exemplary splitter placement across three chips is illustrated. In this example, splitters 1-26 are on chip 801, splitters 27-46 are on chip 802, and splitters 47-64 are on chip 803.

According to various embodiments, assignments are provided using blocks. In such embodiments, a signal partitioning method is provided for efficient placement of cores across K chips. In various embodiments, the partition satisfies the following conditions: the partitions are exhaustive so that the union of all the partitions covers the whole signal space and all the partitions are mutually disjoint; partition sizes are identical for all chips and partition facets are rectangular; the total area of partitioning planes is minimum. These criteria ensure minimum cross-chip edges at overlapping convolution layers.

Figure 9:
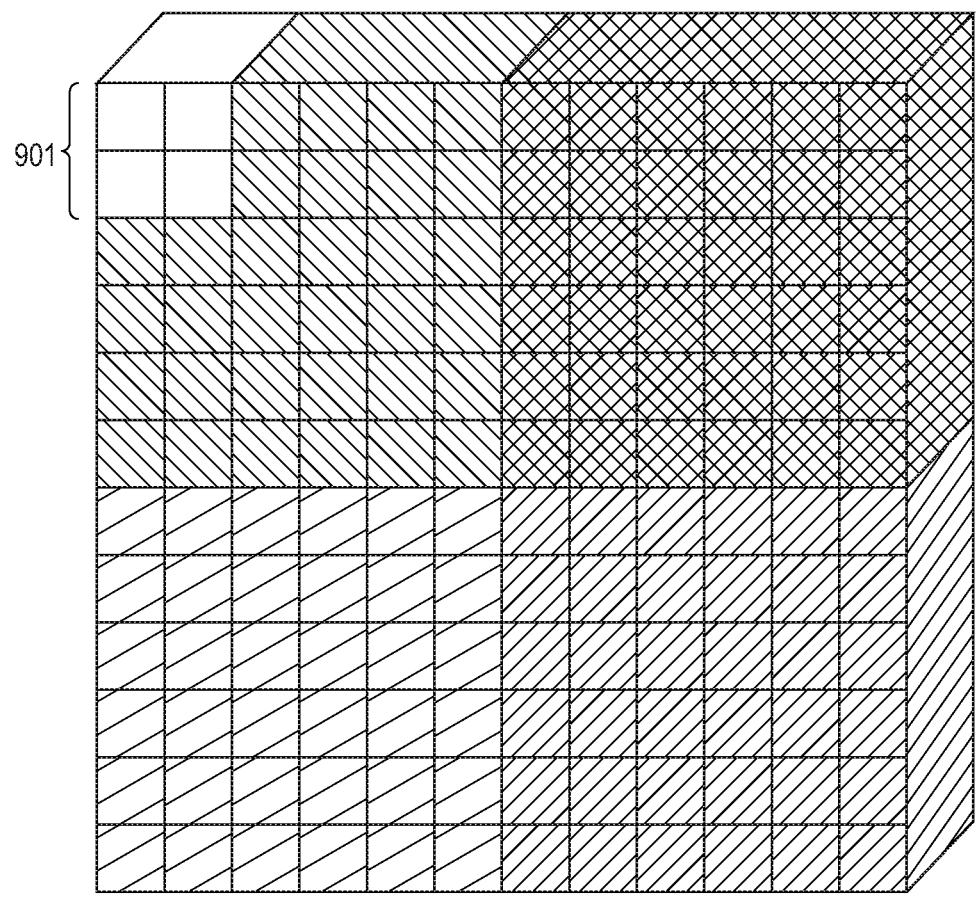
FIG. 9 illustrates a block-based splitter according to embodiments of the present disclosure.

Referring to FIG. 9, a block-based splitter according to various embodiments is illustrated. For a given block size (e.g., 2×2 block 901), the input features are mapped to one or more splitter cores that generate the required number of output copies. The block-based splitting method may consume more cores than the row-based or SFC-based methods outlined above, as cores are dedicated to blocks and unused neurons remain disconnected rather than accommodating features from neighboring blocks. This provides an efficient network of splitter cores irrespective of the feature map dimension and number of chips, but at the cost of additional cores.

Depending on the feature map/input signal dimension and the number of copies of that feature/signal needed, the optimal block size (M×N) is determined such that there is minimal overlap/cross chip communication after placement. This efficient construction helps in placement of each progressive layers in the network. The number of cores used in the space-filling and block-based splitters is summarized below along with the effect on placement.

According to various embodiments, an efficient routing construct is provided to implement a pooling or averaging layer functionality using neuromorphic cores. A pooling layer aggregates the features on a feature map for a given patch size and stride and repeats the aggregation process for all the feature maps.

Figure 10:
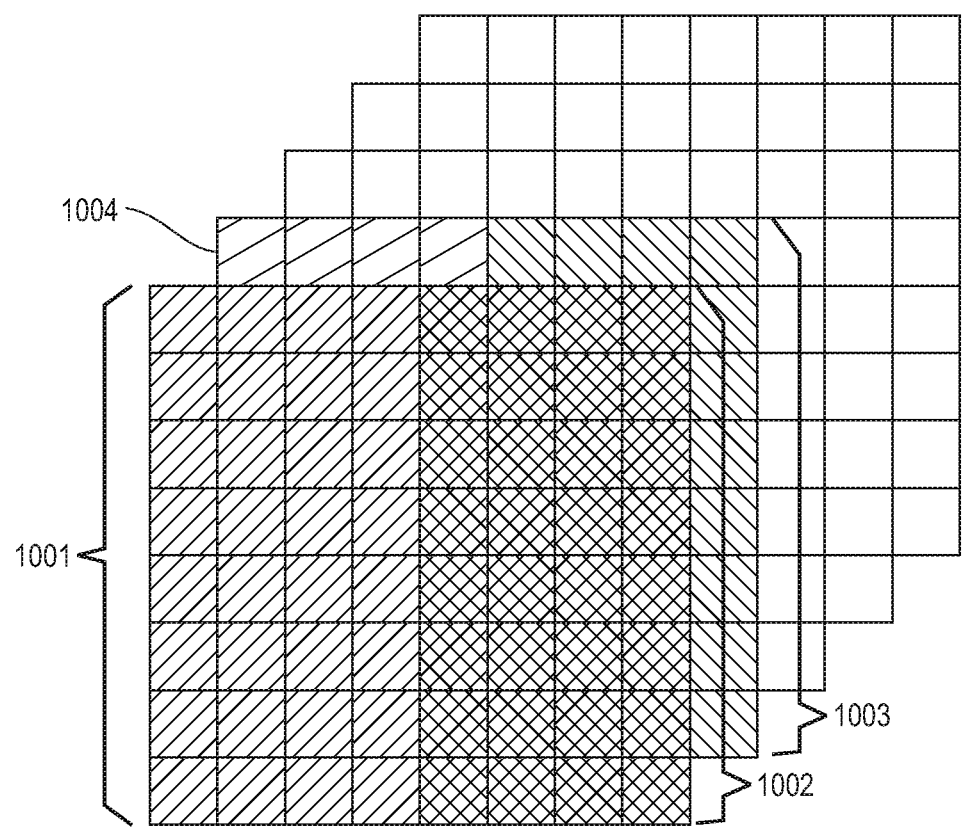
FIG. 10 illustrates an exemplary implementation of a pooling construct according to embodiments of the present disclosure.

Referring to FIG. 10, an exemplary implementation of a pooling construct is illustrated. Regions 1001 . . . 1004 are covered by different cores. For maximum packing of cores, in this example a stripe or rectangular region is selected from a single feature map or multiple stripes are selected from adjacent features maps to pack a single core. The process is continued until all the feature maps are exhausted. Although this method consumes a minimum number of cores for a pooling layer, the routing results in a very inefficient network, not suitable for placement.

Figure 11:
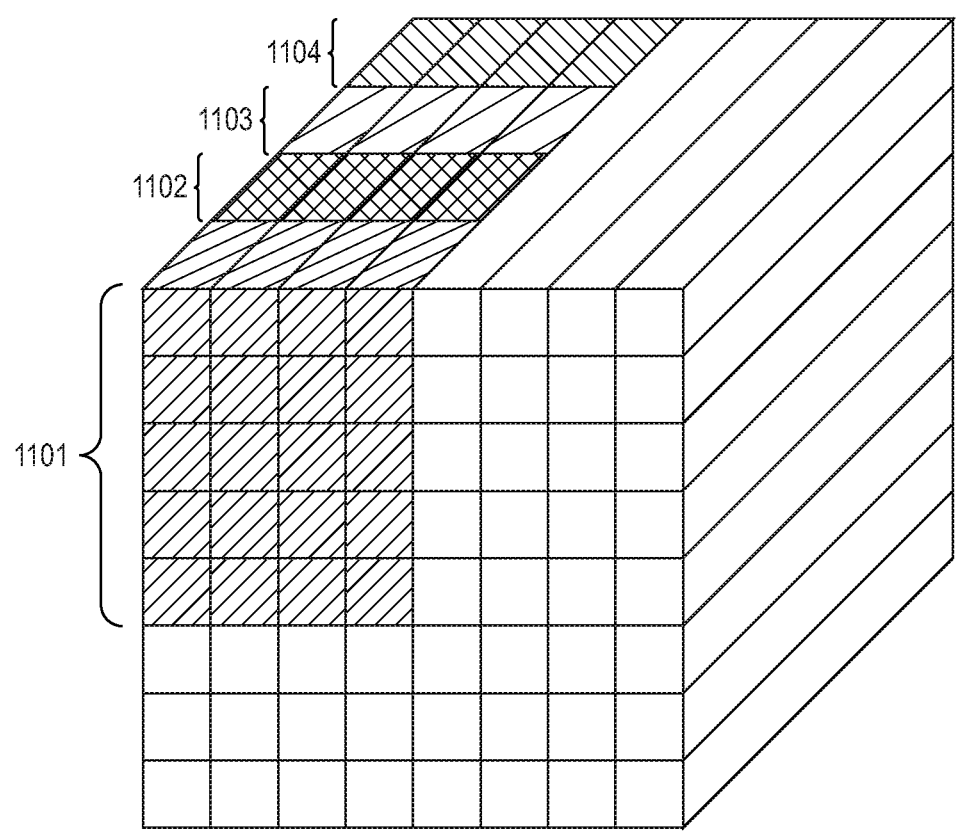
FIG. 11 illustrates a placement-aware implementation of pooling constructs according to embodiments of the present disclosure.
Figure 12:
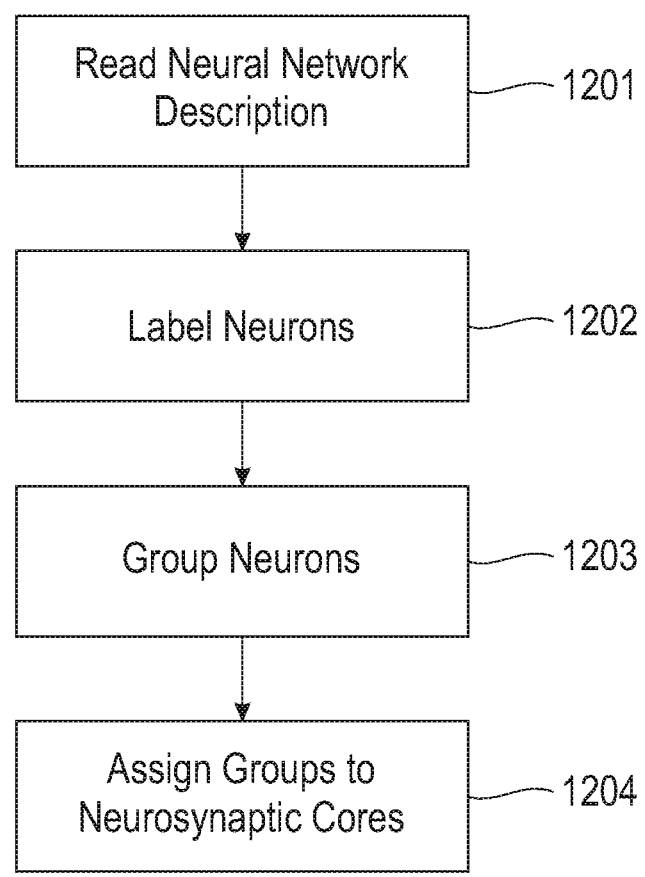
FIG. 12 illustrates a method of assigning neurons to cores in a neurosynaptic system according to embodiments of the present disclosure.
Figure 13:
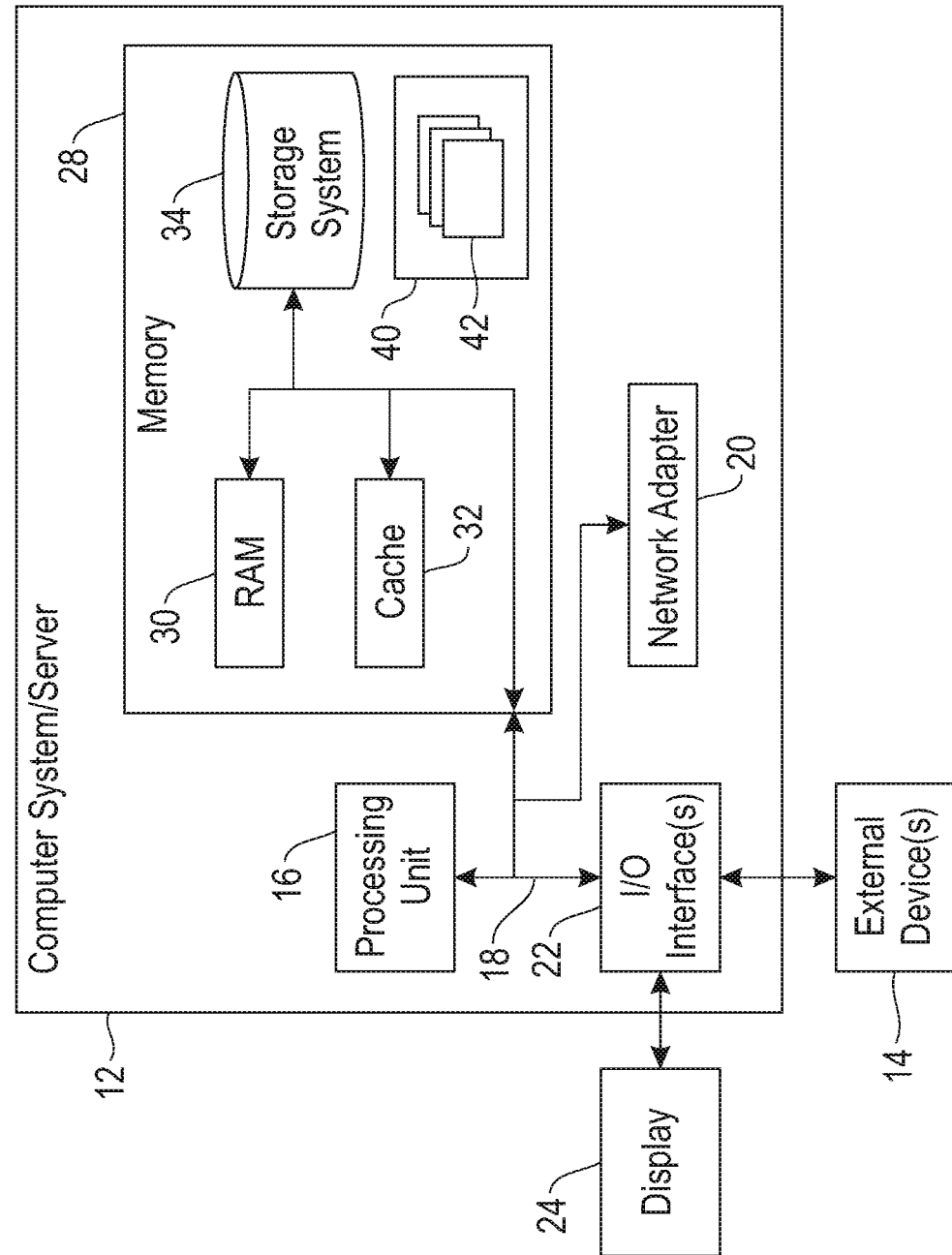
FIG. 13 depicts a computing node according to an embodiment of the present invention.

Referring to FIG. 11, a placement-aware implementation of pooling constructs is illustrated. Regions 1101 . . . 1104 are covered by different cores. In this embodiment, block-based pooling is provided where a block is assigned to a fixed set of cores and the cores perform pooling of the specified block from all the feature maps. The placement-aware pooling layer may require more cores, but often generates more natural output copies, thus reducing the total number of cores. Moreover it provides an efficient network which allows the vertical splitting of the graph of neurosynaptic cores across multiple chips and hence aids in placement.

As discussed above, the present disclosure provides multiple routing constructs implemented using neuromorphic cores on a neuromorphic substrate that may be used as central computational elements for implementing complex cognitive algorithms on neuromorphic hardware using different machine learning frameworks. The following tables reflect test results for the constructs described herein.

Table 1 shows the total number of neurosynaptic cores at each layer of a 4-chip convolution network for the CIFAR-10 dataset. The CIFAR-10 dataset is a reference dataset comprising 60000 32×32 pixel color images in 10 classes, with 6000 images per class.

TABLE 1

Total Number of Neuro-synaptic cores

| Layer No | Layer type | Conventional Splitter + Pooling | SFC-based Splitter + Conventional Pooling | Block-based Splitter + Conventional Pooling | SFC-based Splitter + Placement-aware Pooling | Block-based Splitter + Placement-aware Pooling |
|---|---|---|---|---|---|---|
| 1 | Splitter | 422 | 422 | 512 | 422 | 512 |
| 2 | Conv | 1045 | 1045 | 1045 | 1045 | 1045 |
| 3 | Conv | 1024 | 1024 | 1024 | 1024 | 1024 |
| 4 | Conv | 1024 | 1024 | 1024 | 1024 | 1024 |
| 5 | Pool | 542 | 542 | 542 | 614 | 614 |
| 6 | Splitter | 1497 | 1497 | 1624 | 1396 | 1399 |
| 7 | Conv | 2025 | 2025 | 2025 | 2025 | 2025 |
| 8 | Conv | 450 | 450 | 450 | 450 | 450 |
| 9 | Conv | 450 | 450 | 450 | 450 | 450 |
| 10 | Pool | 238 | 238 | 238 | 264 | 264 |
| 11 | Splitter | 571 | 571 | 575 | 524 | 526 |
| 12 | Conv | 882 | 882 | 882 | 882 | 882 |
| 13 | Conv | 196 | 196 | 196 | 196 | 196 |
| 14 | Conv | 196 | 196 | 196 | 196 | 196 |
| 15 | Splitter | 1335 | 1335 | 1346 | 1335 | 1346 |
| 16 | Conv | 1764 | 1764 | 1764 | 1764 | 1764 |
| 17 | Conv | 588 | 588 | 588 | 588 | 588 |
| 18 | Conv | 441 | 441 | 441 | 441 | 441 |
| 19 | Conv | 392 | 392 | 392 | 392 | 392 |
| Total | | 15082 | 15082 | 15314 | 15032 | 15138 |

Table 2 shows the comparison of total number of cores between SFC-based and Block-based splitters with placement-aware pooling for the CIFAR-10, CIFAR-100, GTSRB, and SVHN. The CIFAR-100 dataset is a reference dataset similar to CIFAR-10, but with has 100 classes containing 600 images each. The German Traffic Sign Benchmark (GTSRB) is a reference dataset comprising over 50,000 images in 40 classes. The Street View House Numbers (SVHN) dataset is a reference data set comprising over 600,000 labeled digit images.

TABLE 2

| | CIFAR10 | CIFAR100 | GTSRB | SVHN |
|---|---|---|---|---|
| SFC-based Splitter | 15032 | 15032 | 11270 | 15118 |
| Block-based Splitter | 15138 | 15138 | 11285 | 15138 |

Table 3-Table 6 show the impact of location aware routing on placement and run-time performances with regard to CIFAR-10, CIFAR-100, GTSRB, and SVHN, respectively.

TABLE 3

| | Wirelength | Avg Hops | MaxHops | Total Port Hops | Avg Port Hops | Max Port Hops | RT Perf |
|---|---|---|---|---|---|---|---|
| NSCP1x4 Block-Based Splitters | 7,700,596 | 14.95 | 220 | 117,885 | 9,824 | 35,375 | 0.5 ms |
| NSCP2x2 Block-Based Splitters | 7,024,686 | 14.79 | 157 | 104,533 | 6,533 | 32,614 | 0.7 ms |

TABLE 4

| | Wirelength | Avg Hops | MaxHops | Total Port Hops | Avg Port Hops | Max Port Hops | RT Perf |
|---|---|---|---|---|---|---|---|
| NSCP1x4 Block-Based Splitters | 7,750,788 | 15.09 | 216 | 119152 | 9929 | 36383 | 0.675 ms |
| NSCP2x2 Block-Based Splitters | 7,089,596 | 14.83 | 174 | 105701 | 6606 | 33632 | 0.675 ms |

TABLE 5

| | Wirelength | Avg Hops | MaxHops | Total Port Hops | Avg Port Hops | Max Port Hops | RT Perf |
|---|---|---|---|---|---|---|---|
| NSCP1x3 Block-Based Splitters | 6,521,129 | 15.89 | 208 | 94965 | 11871 | 39306 | 0.45 ms |
| NSCP1x3 SFC Based Splitters | 6,417,049 | 15.57 | 210 | 95443 | 11930 | 39529 | 0.45 ms |

TABLE 6

|  | Wirelength | Avg Hops | MaxHops | Total Port Hops | Avg Port Hops | Max Port Hops | RT Perf |
|---|---|---|---|---|---|---|---|
| NSCP1x4 Block-Based Splitters | 7,793,973 | 15.06 | 210 | 119,420 | 9952 | 36,093 | 0.45 ms |
| NSCP2x2 Block-Based Splitters | 7,132,689 | 14.97 | 172 | 106,043 | 6628 | 33,106 | 0.6 ms |

Referring to FIG. 14, a method of assigning neurons to cores in a neurosynaptic system is illustrated according to embodiments of the present disclosure. At 1201, a neural network description is read. The neural network description describes a plurality of neurons. The plurality of neurons has a mapping from an input domain of the neural network. At 1202, the plurality of neurons is labeled based on the mapping from the input domain. At 1203, the plurality of neurons is grouped into a plurality of groups according to the labeling. Each of the plurality of groups is continuous within the input domain. At 1204, each of the plurality of groups is assigned to at least one neurosynaptic core.

Referring now to FIG. 15, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    reading a neural network description describing a plurality of neurons, the plurality of neurons having a mapping from an input domain of the neural network, the input domain comprising a plurality of cells, the mapping comprising a one-to-one association between cells of the input domain and the plurality of neurons;
    labeling the plurality of neurons in the description based on the mapping from the input domain, wherein labeling the plurality of neurons comprises applying a space filling curve to the input domain and based on the space filling curve, assigning a label to each of the plurality of neurons;
    grouping the plurality of neurons in the description into a plurality of groups according to the labeling, each of the plurality of groups containing a continuous sequence of cells within the input domain; and
    assigning each of the plurality of groups to a corresponding neurosynaptic core.

2. The method of claim 1, wherein the labeling is proximity-based within the input domain.

3. The method of claim 1, wherein labeling the plurality of neurons comprises:
    partitioning the input domain into a plurality of partitions;
    labeling each of the plurality of neurons according to which of the plurality of partitions each of the plurality of neurons map from.

4. The method of claim 1, wherein the label of each of the plurality of neurons is ordinal.

5. The method of claim 1, wherein the plurality of neurons define a pooling layer.

6. The method of claim 1, wherein the plurality of neurons define a splitting layer.

7. The method of claim 1, further comprising:
    assigning the at least one neurosynaptic core to a chip.

8. The method of claim 1, wherein the space filling curve is a Peano curve, Hilbert curve, dragon curve, Gosper curve, Moore curve, or Sierpiński curve.

9. The method of claim 1, wherein the input domain corresponds to color values for an image.

10. A computer program product for assigning neurons to cores in a neurosynaptic system, the computer program product comprising a computer readable storage medium having program instructions embodied therewith, the program instructions executable by a processor to cause the processor to perform a method comprising:
    reading a neural network description describing a plurality of neurons, the plurality of neurons having a mapping from an input domain of the neural network, the input domain comprising a plurality of cells, the mapping comprising a one-to-one association between cells of the input domain and the plurality of neurons;
    labeling the plurality of neurons in the description based on the mapping from the input domain wherein labeling the plurality of neurons comprises: applying a space filling curve to the input domain and based on the space filling curve, assigning a label to each of the plurality of neurons;
    grouping the plurality of neurons in the description into a plurality of groups according to the labeling, each of the plurality of groups containing a continuous containing a continuous sequence of cells within the input domain; and
    assigning each of the plurality of groups to a corresponding neurosynaptic core.

11. The computer program product of claim 10, wherein the labeling is proximity-based within the input domain.

12. The computer program product of claim 10, wherein labeling the plurality of neurons comprises:
    partitioning the input domain into a plurality of partitions;
    labeling each of the plurality of neurons according to which of the plurality of partitions each of the plurality of neurons map from.

13. The computer program product of claim 10, wherein the label of each of the plurality of neurons is ordinal.

14. The computer program product of claim 10, wherein the plurality of neurons define a pooling layer.

15. The computer program product of claim 10, wherein the plurality of neurons define a splitting layer.

16. The computer program product of claim 10, the method further comprising:
    assigning the at least one neurosynaptic core to a chip.

17. The computer program product of claim 10, wherein the space filling curve is a Peano curve, Hilbert curve, dragon curve, Gosper curve, Moore curve, or Sierpiński curve.

18. The computer program product of claim 10, wherein the input domain corresponds to color values for an image.

* * * * *